United States Patent Office 3,329,021
Patented July 4, 1967

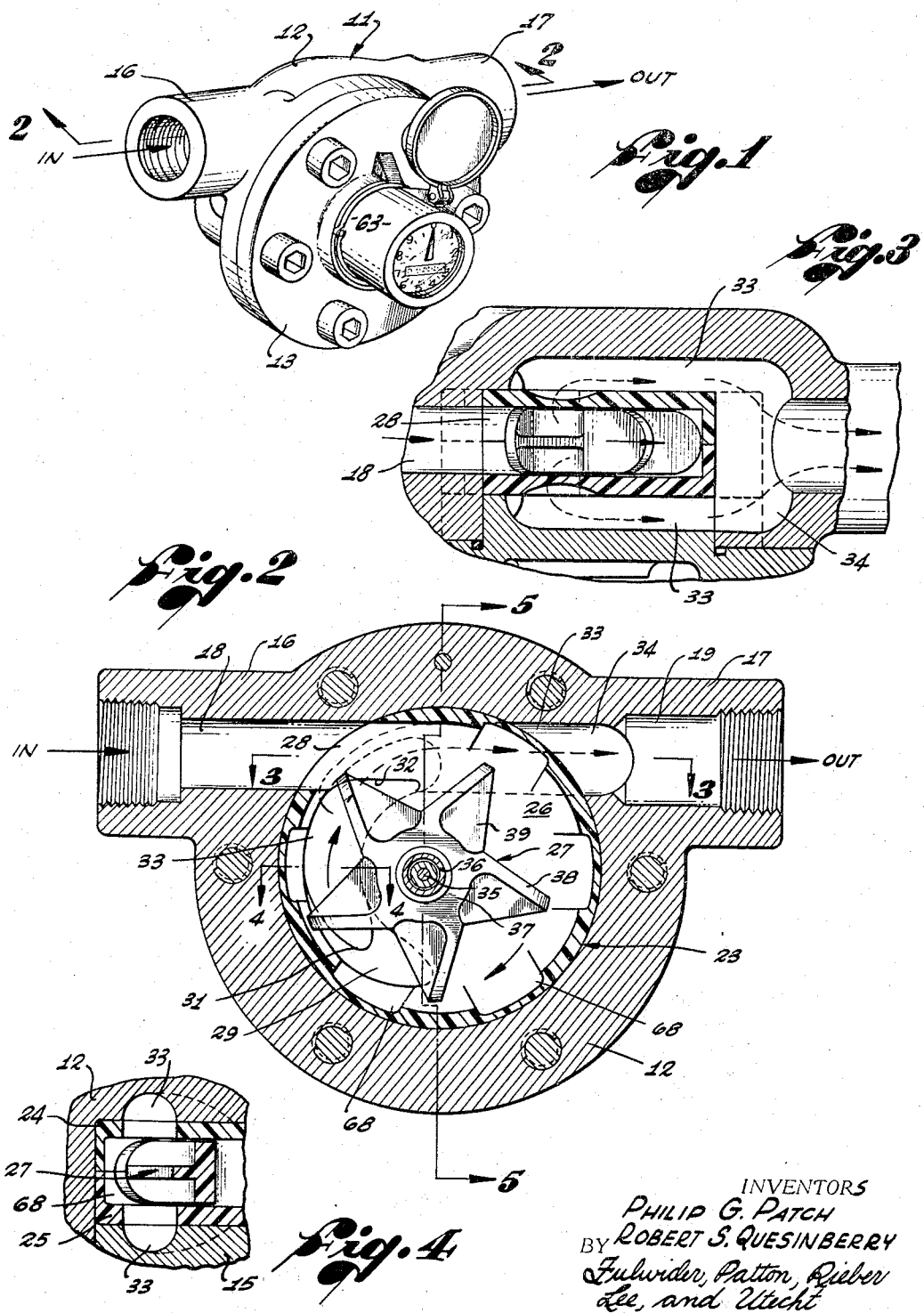

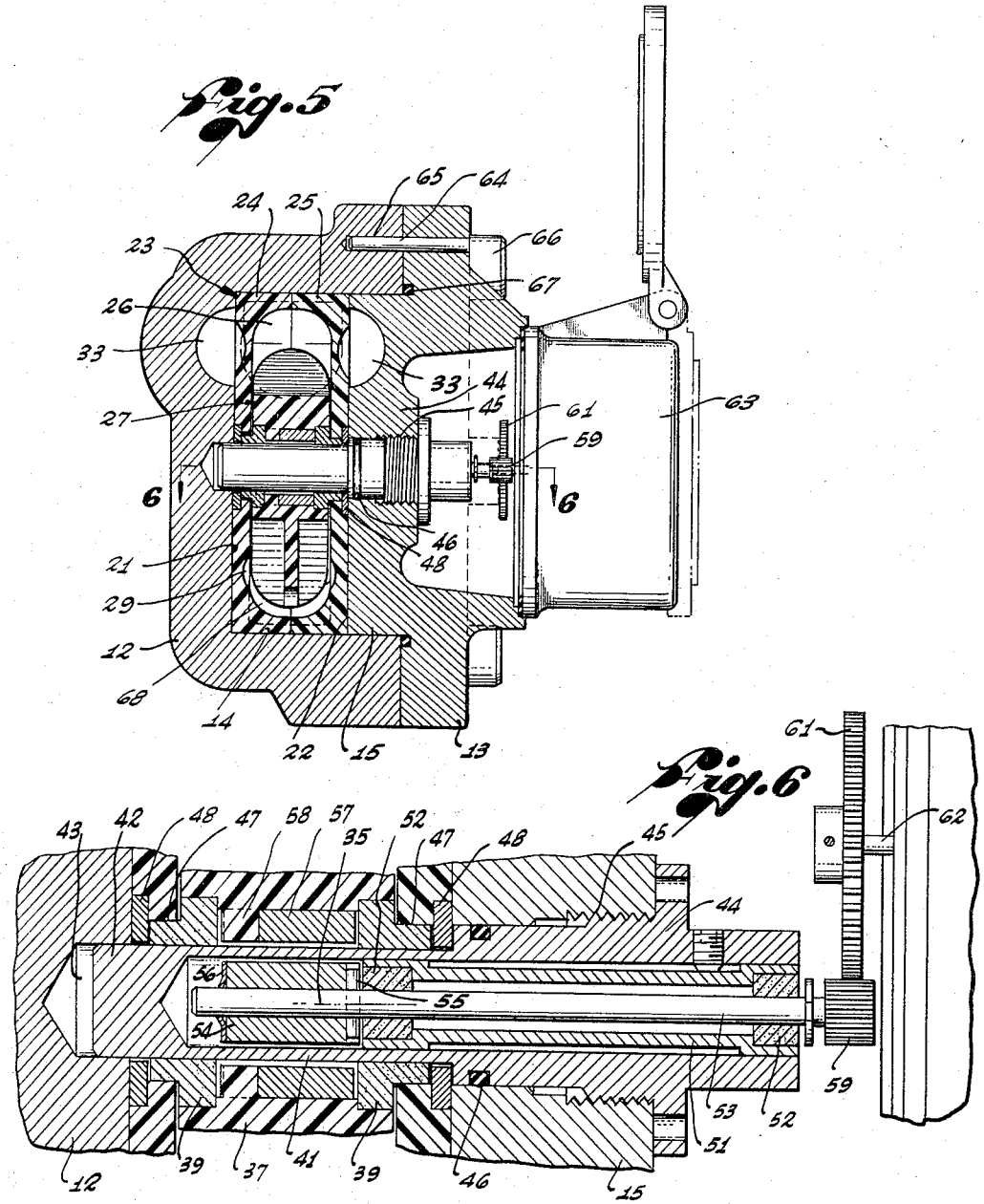

3,329,021
FLUID FLOW METER
Robert S. Quesinberry, Long Beach, and Philip G. Patch, Clemente, Calif., assignors, by mesne assignments, to International Telephone and Telegraph Corporation, New York, N.Y., a corporation of Maryland
Filed Oct. 5, 1964, Ser. No. 401,407
6 Claims. (Cl. 73—229)

The present invention relates generally to meters for measuring fluid flow, and more particularly to velocity type meters employing a rotor driven by the fluid flow.

In various industrial applications it becomes desirable to measure the quantity of fluid which flows through a conduit with considerable accuracy over a broad range of flow rates. Velocity type meters employing a rotor or turbine wheel driven by the velocity of the fluid form a simple, flow-responsive device, and it is an object of the present invention to improve the accuracy and range of response of such velocity type meters.

In the meter according to the present invention, the fluid flow stream is preferably carried substantially entirely around the housing chamber in which the rotor or wheel rotates so that the fluid leaves the meter in the same direction of flow as it enters. To secure this travel the fluid is preferably split into substantially equal parts as it flows out of the chamber to be rejoined outside of the chamber for flow from the outlet. The rotary fluid flow produces a vortex within the meter chamber which is offset from the geometrical axis of the chamber, and it is desirable to locate the axis of rotation of the rotor at the nominal axis of the vortex for a given range of flow, rather than the geometrical axis of the chamber. Further to improve accuracy of meter response, means, such as pockets in the peripheral surface defining the rotor chamber are provided to create turbulence in the fluid flow stream around the chamber.

These features make the rotor more closely follow the fluid flow rate and result in greater accuracy over a wider range of flow, producing a substantially flat response curve. Other features of the invention which will be more fully explained hereinafter result in an improved mounting for the meter rotor which is rigidly supported at both sides with relatively large bearing areas to reduce bearing wear and securely support the rotor against vibration and excess bearing pressure. The meter rotor is preferably magnetically coupled to the meter output shaft and the vortex effect within the meter chamber tends to reduce contamination of the rotor bearings.

It is therefore an object of the present invention to provide an improved fluid flow meter of rugged and dependable construction giving an accurate response over a broad range of flow.

Another object of the present invention is the provision of an improved, high pressure fluid flow meter of increased accuracy over a broad range of flow.

Another object of this invention is the provision of an improved fluid flow meter of the velocity type in which a meter rotor is driven by the velocity of the fluid flowing for substantially 360 degrees around the chamber enclosing the rotor.

A further object of the present invention is the provision of an improved fluid flow meter of the velocity type employing a rotor within a chamber in which the fluid flows in a substantially circular path around the chamber and creates a vortex whose nominal axis is offset from the geometrical axis of the chamber and in which the axis of rotation of the meter rotor is located at the axis of the vortex.

A still further object of the present invention is the provision of an improved, velocity-type fluid flow meter having a rotor in a chamber in the meter housing, in which the fluid flows around the chamber in contact with the rotor through substantially 360 degrees, dividing into substantially equal parts as it leaves the chamber to rejoin and exit from the meter housing in the same direction in which it enters, together with means for creating a turbulence in the flow within the chamber to make the rotor more accurately responsive to the rate of fluid flow through the meter.

Yet another object of the present invention is the provision of an improved, high pressure fluid flow meter of the velocity type providing for improved mounting and coupling of a meter rotor to be rotated by flow of fluid through the meter.

These and other objects and features of the invention will be readily apparent to those skilled in the art from the following specification and the appended drawings, in which:

FIGURE 1 is a perspective view of a fluid flow meter according to the present invention;

FIGURE 2 is an enlarged vertical sectional view on the line 2—2 of FIGURE 1;

FIGURE 3 is a further enlarged detail view on the line 3—3 of FIGURE 2;

FIGURE 4 is a detail sectional view on the line 4—4 of FIGURE 2;

FIGURE 5 is a transverse, vertical sectional view on the line 5—5 of FIGURE 2; and FIGURE 6 is an enlarged partial sectional view on the line 6—6 of FIGURE 5 showing the magnetic coupling between the meter rotor and output shaft.

The fluid flow meter 11 in the illustrated embodiment of the present invention employs a generally cup-shaped rear housing 12 closed by a front cover 13, both preferably of strong metallic construction. The rear housing 12 has a generally cylindrical recess 14 therein into which projects a complementary central boss 15 on the rear face of the front cover 13. A pair of hubs 16 and 17 extend in opposite directions from the rear housing 12 adjacent the top thereof and are bored at 18 and 19 to provide, respectively, an inlet and an outlet for the recess 14 in the housing, the bores 18 and 19 extending substantially tangentially with respect thereto.

The recess 14 in the rear housing 12 is bounded by the forward facing surface 21 within the recess and the back surface 22 on the boss 15, and within the space so provided is a liner 23 which may be of plastic material, such as polypropylene. The liner 23 is formed by a pair of generally circular sections 24 and 25 defining therebetween a chamber 26 within which is disposed a meter rotor 27. The sections 24 and 25 are provided with openings 28 aligned with the bore 18 whereby the fluid whose flow is to be measured enters the chamber 26 substantially tangentially thereof, as shown more particularly in FIGURE 2.

Beginning at a point preferably more than 180 degrees around the liner 23, the opposed interior walls thereof are smoothly opened toward the adjacent surfaces 21 and 22 of the housing 12 and boss 15. These gradual side openings in the sections 24 and 25 are shown at 29 in FIGURES 2 and 5 and produce openings through the walls of the liner sections beginning at 31 and terminating at 32 and arcuate in form, as shown in FIGURE 2. These openings 29 in the liner sections communicate with graduated recesses in the surfaces 21 and 22 which begin shallow at 31 and become semicircular in cross-section adjacent their ends 33 which are disposed on opposite sides of the liner 23, as shown in FIGURES 3 and 5. The spaced recesses 33 in the surfaces 21 and 22 join in a chamber 34 which is in communication with the bore 19 which forms the outlet from the meter.

Fluid flow through the meter therefore takes the following path: entering through bore 18, it passes through openings 28 into the chamber 26 substantially tangentially, at the top thereof, as shown in FIGURE 2. The entering fluid then flows in a substantially circular path about the inner peripheral surface of the liner 23 and contacts the rotor wheel 27 to effect rotation thereof. At the openings 29, equal parts of the fluid flow start to move outwardly at the opposite sides of the chamber 26 and continue into the recesses 33 at the opposite sides of the liner until at the edge 32 all of the fluid has divided into two equal parts and passed out of the chamber 26 at opposite sides thereof in a balanced exit. The opposite side flows join at 34 and exit from the meter through the bore 19, substantially tangentially of the chamber 26 and in line with and in the same direction as the entering flow.

The rotary path of the fluid flow in chamber 26 produces a vortex having a nominal axis at 35 for a given range of flow rates which is offset, as shown in FIGURE 2, from the geometrical axis 36 of chamber 26 and the rotor 27 is preferably mounted for rotation about an axis coinciding with the vortex axis 35. The rotor 27 is preferably of a molded plastic material which may be polypropylene similar to that forming the liner 23. It includes a central hub 37 having a plurality of paddles 38 extending outwardly therefrom and reinforced by gussets. The paddles 38 extend into the flow stream path and effect movement of the rotor 27 at a speed determined by the velocity of the flow. In the hub 37 are pressed a pair of annular bearings 39 located at opposite sides of the rotor and preferably formed of graphite or other good bearing material. A tubular permanent magnet 57 of molded ceramic or other material is mounted concentrically within the hub 37 and prevented from rotating relative to the rotor by interlocking projection and slot at 58. The internal diameter of the permanent magnet 57 is greater than the internal diameter of the bearings 39 so that the magnet 57 rotates freely.

A hollow shaft 41 mounting the rotor 27 has a closed end 42 received within a press fit socket 43 in the rear housing 12. The forward end of the holder shaft 41 has an enlarged mounting portion 44 threadedly mounted at 45 within a bore through the hub 15 and sealed by a flexible ring 46. The shaft 41 is mounted so that its axis coincides with the nominal vortex axis 35. The liner sections 24 and 25 are provided with central openings at 47 through which the shaft 41 extends, and metallic washers 48 are disposed about the shaft 41 at the surfaces 21 and 22 to have their opposed faces engaged in sliding relation by the ends of the bearings 39.

Within the hollow shaft 41 is mounted a tubular member 51 having a pair of bearings 52 at its opposite ends in which is rotatably mounted a meter output shaft 53. A tubular permanent magnet 54 is mounted on the inner end of shaft 53 between a cross pin 55 and a press-on nut 56. The permanent magnet 54 may also be of molded ceramic or other material and the pin 55 is received in a slot in its end face to prevent rotation relative to the shaft 53. The magnet 54 is smaller in diameter than the interior surface of the hollow shaft 41. The shaft 41 is desirably of non-magnetic material so as not to shield the fields produced by the magnets 54 and 57 which thereby interact so that the magnet 54 follows the rotation of magnet 57 as a slave and the shaft 53 rotates synchronously with the rotor 27. A pinion 59 is locked on the outer end of the output shaft 53 and meshes with a gear 61 mounted on a shaft 62 forming the input to a conventional recorder and indicator 63.

As shown more particularly in FIGURE 5, a pin 64 is mounted in and projects rearwardly from the cover 13 to be received within a complementary opening 65 in the front face of the rear housing 12 so as to index the cover with the housing. The cover and housing are securely joined by bolts 66 and are sealed by a ring 67.

To increase the accuracy of the instrument over a wider range of flow rates, it is desired to break up the smooth flow of the stream within the chamber 26 and create turbulence therein. While this may be done in many ways, by baffling and other obstructions in the chamber, it has been found preferable to provide a plurality of pockets or recesses 68 in the liner sections 24 and 25 at the periphery of the chamber 26, as shown in FIGURES 2, 4 and 5. These pockets are more or less uniformly spaced around the chamber 26 at a distance apart which is preferably different than the spacing between the paddles 38 on the rotor 27 so as to avoid coincident coaction between the paddles and the pockets and the possibility of major pulsations within the meter chamber. It has been found that the pockets or recesses 68 will cause sufficient turbulence in the fluid flow around the chamber 26 to increase the accuracy of the meter over a broader range of flow rates by producing a substantially flat response curve over a wide range.

While it will be understood that the nominal axis 35 of the vortex within the chamber 26 may vary its position if the flow velocity changes greatly, it is maintained substantially in the position illustrated over a relatively broad flow range and the locating of the axis of the rotor 27 coincident with this nominal vortex axis for the expected range of flow further increases the accuracy of response of the meter. The accuracy of the rotor in following the velocity of the fluid flow is increased by carrying the contact of the fluid with the rotor paddles throughout substantially 360 degrees around the meter chamber, with the fluid entering and exiting the meter in substantially the same direction and with the fluid splitting into substantially equal parts as it leaves the meter chamber at opposite sides thereof in a balanced relation, to rejoin at the meter outlet. A further advantage of the vortex effect within the meter chamber is to reduce contamination of the rotor bearings and magnet.

The magnetic coupling of the rotor 27 to the meter output shaft 53 allows the meter chamber to be entirely sealed so that there is no leakage therefrom and no introduction of high pressure into the recording and indicating elements of the matter. This magnetic coupling further eliminates any packing drag on the meter output shaft to increase the accuracy of response to the velocity of fluid flow. The shaft 41 is rigidly mounted at both ends and supports the rotor at both sides with relatively large bearing areas to thereby provide a rigid long wearing mounting for the rotor.

While a certain preferred embodiment of the invention has been specifically described and illustrated in accordance with the requirements of the patent statutes, it is understood that the invention is not limited thereto as many variations will be apparent to those skilled in the art, and the invention is to be given its broadest interpretation within the terms of the following claims.

We claim:

1. A fluid flow meter comprising: housing means providing a generally circular chamber; a rotor mounted in said chamber for rotation about an axis transverse thereto; meter read-out means; means coupling said rotor to said read-out means; an inlet for said chamber directed substantially tangential thereto; an outlet from said chamber substantially aligned with said inlet whereby fluid to be metered travels substantially 360 degrees around the chamber in contact with the rotor to exit in substantially the same direction in which it enters; and means adjacent said outlet and extending outside of said chamber at opposite sides thereof to connect the chamber with the outlet whereby after traveling around the chamber the fluid splits into substantially equal parts at opposite sides thereof to rejoin at said outlet.

2. A fluid flow meter comprising: housing means providing a generally circular chamber; a rotor mounted in said chamber for rotation about an axis transverse thereto; meter read-out means; means coupling said rotor to said read-out means; an inlet for said chamber directed substantially tangential thereto; an outlet from said chamber substantially aligned with said inlet whereby fluid to be metered travels substantially 360 degrees around the chamber in contact with the rotor to exit in substantially the same direction in which it enters, said fluid in its path around the chamber establishing a vortex having a nominal axis offset from the circular axis of the chamber; and means mounting said rotor so that its axis of rotation coincides with the nominal axis of the vortex for a given range of fluid flow rates.

3. A fluid flow meter comprising: housing means providing a generally circular chamber; a rotor mounted in said chamber for rotation about an axis transverse thereto; meter read-out means; means coupling said rotor to said read-out means; an inlet for said chamber directed substantially tangential thereto; an outlet from said chamber substantially aligned with said inlet whereby fluid to be metered travels substantially 360 degrees around the chamber in contact with the rotor exit in substantially the same direction in which it enters, said fluid in its path around the chamber establishing a vortex having a nominal axis offset from the circular axis of the chamber; means mounting said rotor so that its axis of rotation coincides with the nominal axis of the vortex for a given range of fluid flow rates; and means in said chamber adjacent the periphery thereof for effecting turbulence in the fluid flow stream to increase the accuracy of response of rotor rotation to fluid flow velocity.

4. A fluid flow meter comprising: housing means providing a generally circular chamber; a rotor mounted in said chamber for rotation about an axis transverse thereto; meter read-out means; means coupling said rotor to said read-out means; an inlet for said chamber directed substantially tangentially thereto; an outlet from said chamber, fluid pasing through the chamber between said inlet and outlet in contact with said rotor to effect rotation thereof at rates corresponding to the velocity of fluid flow, the path of said fluid within the chamber establishing a vortex having a nominal axis for a given range of flow rates offset from the circular axis of the chamber; and means mounting said rotor so that its axis of rotation coincides with said nominal vortex axis.

5. A fluid flow meter comprising: housing means providing a generally circular chamber; a rotor mounted in said chamber for rotation about an axis transverse thereto; meter read-out means; means coupling said rotor to said read-out means; an inlet for said chamber directed substantially tangentially thereto; an outlet from said chamber, fluid passing through the chamber between said inlet and outlet in contact with said rotor to effect rotation thereof at rates corresponding to the velocity of fluid flow, the path of said fluid within the chamber establishing a vortex having a nominal axis for a given range of flow rates offset from the circuit axis of the chamber; means mounting said rotor so that its axis of rotation coincides with said nominal vortex axis; and means in said chamber between said inlet and outlet for causing turbulence in the fluid flow stream to increase the accuracy of response of the rotor to the fluid flow.

6. A fluid flow meter comprising: housing means providing a generally circular chamber; a rotor mounted in said chamber for rotation about an axis transverse thereto; an inlet for said chamber directed substantially tangentially thereto; an outlet from said chamber, the fluid passing around the chamber between said inlet and outlet through substantially 360 degrees in contact with said rotor to effect rotation thereof at rates corresponding to the velocity of fluid flow, the path of said fluid within the chamber establishing a vortex having a nominal axis for a given range of flow rates offset from the circuit axis of the chamber; a hollow shaft mounting said rotor so that its axis of rotation coincides with said nominal vortex axis, said rotor including a permanent magnet mounted to rotate therewith; a meter output shaft rotatably mounted in said rotor mounting shaft; and a second permanent magnet mounted on said meter output shaft to follow the rotor magnet as a slave upon rotation of the rotor.

References Cited
UNITED STATES PATENTS

| | | | |
|---|---|---|---|
| 133,438 | 11/1872 | Gray et al. | 73—230 X |
| 597,066 | 1/1898 | Marsh | 73—230 |
| 2,770,131 | 11/1956 | Sparling | 73—231 |
| 2,906,121 | 9/1959 | Knauth | 73—229 |
| 3,091,118 | 5/1963 | Hubbard | 73—230 |
| 3,144,768 | 8/1964 | Gehre | 73—229 X |
| 3,174,337 | 3/1965 | Smith | 73—229 |
| 3,187,571 | 6/1965 | Borel | 73—230 |

FOREIGN PATENTS

| | | |
|---|---|---|
| 9,809 | 9/1879 | Germany. |
| 334,746 | 1/1936 | Italy. |

RICHARD C. QUEISSER, *Primary Examiner.*

E. D. GILHOOLY, *Assistant Examiner.*